United States Patent
Butler et al.

(10) Patent No.: US 7,324,979 B2
(45) Date of Patent: Jan. 29, 2008

(54) GENETICALLY ADAPTIVE NEURAL NETWORK CLASSIFICATION SYSTEMS AND METHODS

(75) Inventors: Gary Dana Butler, Alexandria, VA (US); Andrew Charles Coon, Columbia, MD (US); Robert Warren Kanyuck, Laurel, MD (US); Ernest Scott Stickels, Lothian, MD (US)

(73) Assignee: BBN Technologies Corp., Cambridge, MA (US)

( * ) Notice: Subject to any disclaimer, the term of this patent is extended or adjusted under 35 U.S.C. 154(b) by 547 days.

(21) Appl. No.: 10/652,542

(22) Filed: Aug. 29, 2003

(65) Prior Publication Data

US 2005/0049983 A1    Mar. 3, 2005

(51) Int. Cl.
  *G06G 7/00*  (2006.01)
  *G06N 5/00*  (2006.01)
(52) U.S. Cl. ............................. 706/25; 706/20; 706/45
(58) Field of Classification Search .................. 706/13, 706/12, 14, 25, 20, 45
See application file for complete search history.

(56) References Cited

U.S. PATENT DOCUMENTS

| | | | | |
|---|---|---|---|---|
| 5,581,657 A * | 12/1996 | Lyon | ............................ | 706/13 |
| 5,781,698 A * | 7/1998 | Teller et al. | ................... | 706/13 |
| 5,845,237 A * | 12/1998 | Puel et al. | ................... | 702/179 |
| 5,933,818 A * | 8/1999 | Kasravi et al. | ................ | 706/12 |
| 6,272,479 B1 * | 8/2001 | Farry et al. | .................... | 706/13 |
| 6,601,053 B1 * | 7/2003 | Schaffer et al. | ............... | 706/26 |
| 6,658,396 B1 * | 12/2003 | Tang et al. | .................... | 706/17 |
| 2003/0088458 A1 * | 5/2003 | Afeyan et al. | ................ | 705/10 |
| 2004/0242972 A1 * | 12/2004 | Adak et al. | .................. | 600/300 |

OTHER PUBLICATIONS

Tagliaferri et al, "Hybrid Neural Networks for Frequency Estimation of Unevenly Sampled Data", IEEE IJCNN, Jul. 1999.*
Hancock, Pruning Neural Nets by Genetic Algorithm, Centre for Cognitive Computational Neuroscience, 1992, Departments of Psychology and Computing Science, University of Stirling, Stirling FK9 4LA, Scotlnd, UK, pp. 1-4.*

* cited by examiner

*Primary Examiner*—Wilbert L Starks, Jr.
(74) *Attorney, Agent, or Firm*—Ropes & Gray LLP (57) ABSTRACT

Genetically adaptive neural network systems and methods provide environmentally adaptable classification algorithms for use, among other things, in multi-static active sonar classification. Classification training occurs in-situ with data acquired at the onset of data collection to improve the classification of sonar energy detections in difficult littoral environments. Accordingly, in-situ training sets are developed while the training process is supervised and refined. Candidate weights vectors evolve through genetic-based search procedures, and the fitness of candidate weight vectors is evaluated. Feature vectors of interest may be classified using multiple neural networks and statistical averaging techniques to provide accurate and reliable signal classification.

26 Claims, 5 Drawing Sheets

GENETICALLY ADAPTIVE NEURAL NETWORK CLASSIFICATION SYSTEMS AND METHODS

The U.S. Government has a paid-up license in this invention and the right in limited circumstances to require the patent owner to license others on reasonable terms as provided for by the terms of government contract No. N00014-00-D-0133, which was awarded by the Office of Naval Research.

TECHNICAL FIELD

The present invention provides systems and methods for genetically adaptive neural network signal classification.

BACKGROUND

Historically, approaches to classification systems for impulsively activated underwater sonar have largely relied on exploiting signal waveform features to distinguish target echoes from clutter echoes. Typically, one uses signal waveform features as the input for various classification algorithms designed in a laboratory environment. Using data acquired and processed from prior training exercises, these classification algorithms are trained to increase their accuracy.

However, signal waveform features often exhibit environmental sensitivities, which, when unaccounted for, lead to degraded classification performance of sonar energy detections. These environmental sensitivities may occur as a function of factors such as, water temperature, time of year, target depth, and geometry of the ocean bottom. These factors significantly affect underwater acoustic propagation by creating clutter that can interfere with properly classifying signal data. Even if one could develop predictable target echo features based on physics, one would still find the statistical behavior of clutter with respect to detected features difficult, if not impossible, to predict for a particular environment. In the absence of accurate predictions, inaccurate signal classifications result.

In addition, when operating in new environments without historical data to guide signal classification, traditional approaches to signal classification often yield inaccurate results. Improved systems and methods of signal classification are therefore needed.

SUMMARY

A system consistent with the present invention for genetically adaptive signal classification comprises various elements. A learning supervisor processes a population of weight vectors in a neural network using training data. A fitness evaluator coupled to the learning supervisor evaluates a fitness of the weight vectors against a stopping criterion based on the output of the weight vector processing by the learning supervisor. A genetic operator, coupled to the fitness evaluator and the learning supervisor, modifies the population of weight vectors and provides the modified weight vectors to the learning supervisor until the fitness evaluator indicates that the fitness of the weight vectors meets the stopping criterion.

A method consistent with the present invention for genetically adaptive signal classification comprises various steps. A population of weight vectors is processed in a neural network using training data. A fitness of the weight vectors is evaluated against a stopping criterion based on the output of the weight vector processing. The population of weight vectors is modified and the fitness of the modified weight vectors is evaluated until the fitness meets the stopping criterion.

A system consistent with the present invention provides genetically adaptive signal classification of sonar waveforms. A learning supervisor processes a population of weight vectors in a neural network using training data. A fitness evaluator coupled to the learning supervisor evaluates a fitness of the weight vectors against a stopping criterion based on the output of the weight vector processing by the learning supervisor. A genetic operator, coupled to the fitness evaluator and the learning supervisor, modifies the population of weight vectors and provides the modified weight vectors to the learning supervisor until the fitness evaluator indicates that the fitness of the weight vectors meets the stopping criterion.

Both the foregoing general description and the following detailed description are exemplary and explanatory only, and do not restrict the invention as claimed. The accompanying drawings, which are incorporated in and constitute a part of this specification, illustrate embodiments consistent with the invention.

DESCRIPTION OF THE EMBODIMENTS

The following paragraphs describe embodiments consistent with the present invention. Wherever possible, the same reference numbers in different drawings refer to the same or like parts. Unless specified otherwise, the specific implementation details are not critical.

Systems and methods consistent with the present invention can provide several advantages, such as improved accuracy in target detection over neural network classifiers using traditional approaches.

One may train a neural network to arrive at a set of weights that will yield accurate results for real world signal classification. During a real world mission in which a vessel, such as a submarine, uses sonar, signal waveforms propagate through water and reflect back to the vessel after contacting a surface. The returning sonar waveform is often referred to as a "ping." Training of a neural network can occur in-situ and at the start of a multi-static active sonar mission. Such training can use a set of data comprising archived target samples from previous training exercises and clutter collected at an initial ping of the mission in connection with a genetically adaptive algorithm.

To improve signal classification over traditional approaches, one can use neural networks. Neural networks comprise an interconnection of simple computing cells, or "neurons," connected by "links" with variable "weights." Neural networks may be subjected to a training process in which known inputs produce known outputs to adjust the links and weights. Selection of the appropriate set of weights provides neural networks with the ability to generalize, thus producing reasonable output for inputs not encountered during the training process. Used for signal classification purposes, neural networks explore many competing hypotheses to identify the classes of data that are most representative of an unknown input.

Neural networks thus represent nonlinear parametric models that approximate continuous input-output relationships. The quality of the approximation depends principally on the architecture of the network and the complexity of the data. Neural networks derive their computing power through a massively parallel, distributed structure and their ability to capture experiential knowledge from an interactive training process.

Figure 1:
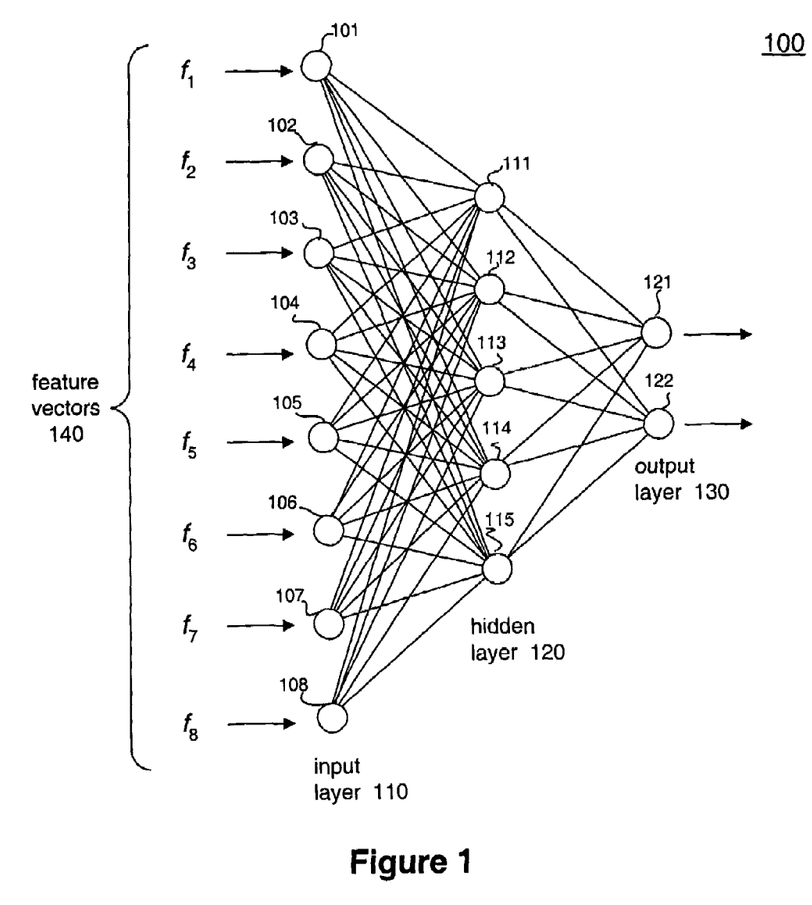
FIG. 1 is a diagram of exemplary neural network architecture.

FIG. 1 shows a diagram of exemplary neural network architecture 100. Exemplary neural network architecture 100 exhibits a multi-layer perception in the form of a three-layer feed-forward neural network comprising several neurons or "nodes" in the network, 101-108, 111-115, and 121-122. These nodes are arranged in an input layer 110 with eight input neurons or nodes 101-108, a hidden layer 120 with five neurons or nodes 111-115, and an output layer 130 with two output neurons or nodes 121-122.

With respect to classification of sonar energy detections, data classes include clutter and target echoes, which are represented as multi-dimensional feature vectors f1-f8 collectively labeled 140. Clutter data includes signal waveforms representing non-target data. Target data includes signal waveforms representing targets, such as enemy submarines, for example.

Each node is a simplified model of a single neuron or node that acts as a simple processing unit. Each node can compute a value with respect to incoming feature vectors 140. Feature vectors 140 enter the network via input layer 110 and are processed by input layer 110 and hidden layer 120. Output layer 130 provides the output results of neural network architecture 100.

Figure 2:
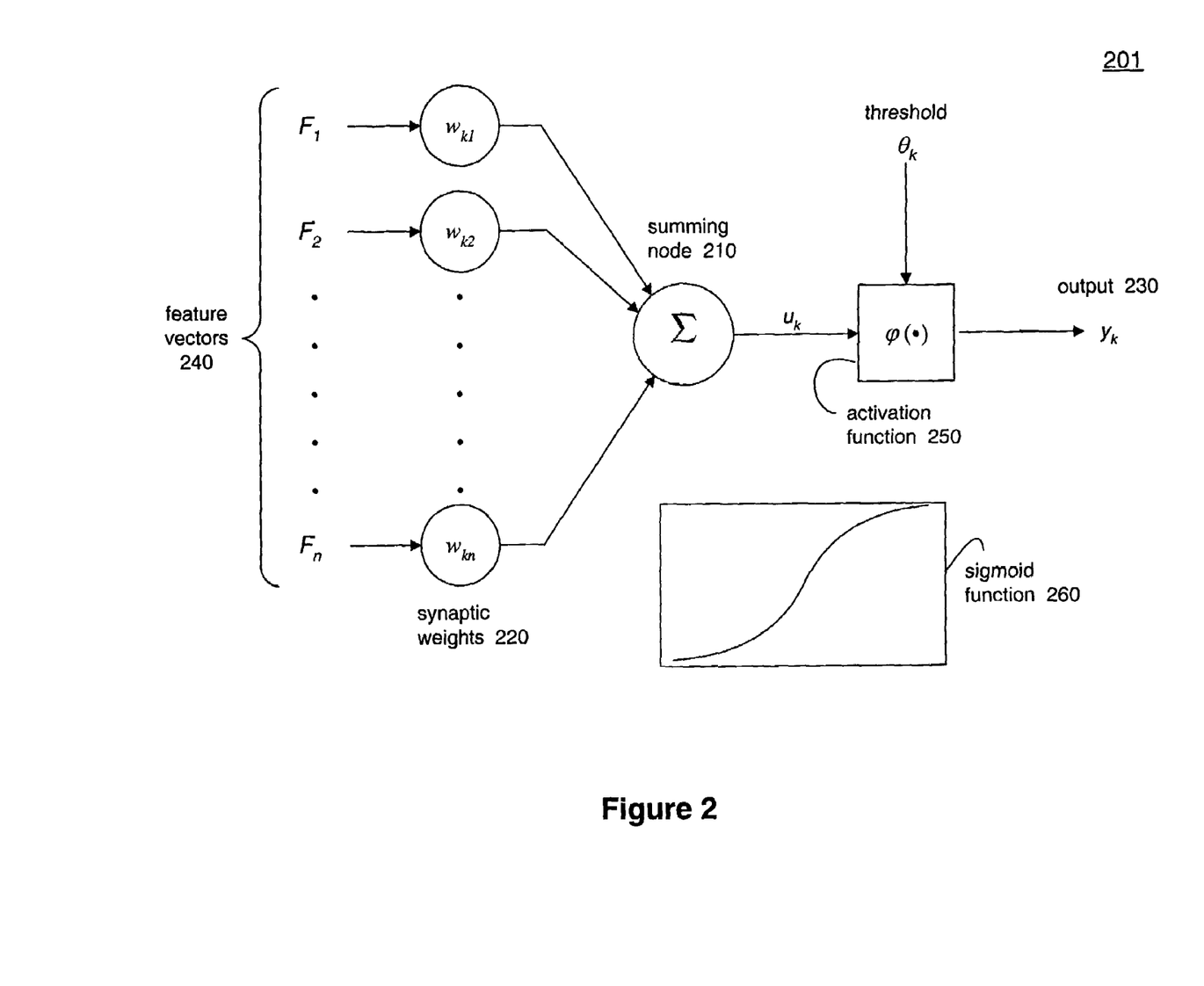
FIG. 2 is a diagram of an exemplary neuron in the neural network architecture of FIG. 1.

FIG. 2 shows a model of an exemplary neuron 111 in neural network architecture 100. Neuron 111 includes a summing node 210, which may have N input feature values F1-F$_n$, collectively labeled 240, N weighted inputs w, such as synaptic weights 220, and a single output 230. Output 230 represents the output result of node 111, which is the result of a sigmoid activation function 250 operating on the summed input of feature vectors 240 and synaptic weights 220, biased by a threshold θ. This relationship is expressed by $$y_k = \Psi(u_k - \theta_k) \quad (1)$$

where, $$u_k = \Sigma w_{k,i} F_i \quad (2)$$

The activation function 250 is the sigmoid function 260, defined as, $$\Psi(u) = \frac{1}{1+e^{-u}} \quad (3)$$

Combining equations (1) and (2) yields:

$$y_k = \Psi(\Sigma w_{k,i} F_i - \theta_k) \quad (4)$$

Equation (4) represents the output value from the neural network's $k^{th}$ node from an input feature vector.

The nodes are arranged in layers, and each node has its inputs connected to the nodes of a preceding layer. In the case of the nodes in the first layer, each node is connected to inputs from the external world. The layers are configured so that there is an input layer 110, any desired number of hidden layers 120, and an output layer 130, as discussed in connection with FIG. 1.

A neural network acquires knowledge through iterative training that involves adjustments applied to its weights and thresholds. More specifically, the training process comprises an adaptation of the interconnection and values of weights to achieve a desired mapping of known inputs to known outputs. Various techniques may be used for training neural networks to determine the optimal set of weights for the neural network for a given classification problem. Once an acceptable set of weights is derived, the neural network can then be used as an algorithm for classifying unknown input data.

A popular approach used for training neural networks is known as backpropagation. In particular, a backpropagation algorithm computes partial derivatives of an approximating function. The algorithm examines a network with respect to all elements by assigning an adjustable weight for a given input value. It is a gradient or derivative technique, which searches for possible weight values in what is deemed the "weight space," a universe of acceptable weight values, until a minimum value of a cost function or an error surface is achieved. Once a minimum value is determined, the algorithm terminates.

However, because the backpropagation algorithm uses a local slope descent technique, a search may become stuck in one of many local minima even though another point in the weight space may have a smaller error value. As a result, the algorithm may find an error value for the network that may be a local minimum but not a global minimum. Terminating the training process of weights at a local minimum may result in a poor set of weights, especially if the local minimum value is much larger than the global minimum value.

Genetic algorithms provide an advantage over techniques such as the backpropagation algorithm, which may yield inaccurate results. Genetic algorithms can be described as global search algorithms that are based on the principles of natural evolution. Genetic algorithms generally manipulate values of a variable to optimize a function. A genetic algorithm is initiated by creating a population of candidate solutions in the form of "binary chromosomes." The initial value of each binary chromosome is typically chosen at random and represents candidate weights for a given neural network topology and may be applied to neural network training.

Candidate weights, in the form of binary chromosomes, compete against each other within the population to achieve a specific task or goal. Candidate weights are evaluated by a fitness function and are evolved through multiple iterations by undergoing genetic operations, such as selection and crossover processing, to generate new candidate weights.

Figure 3:
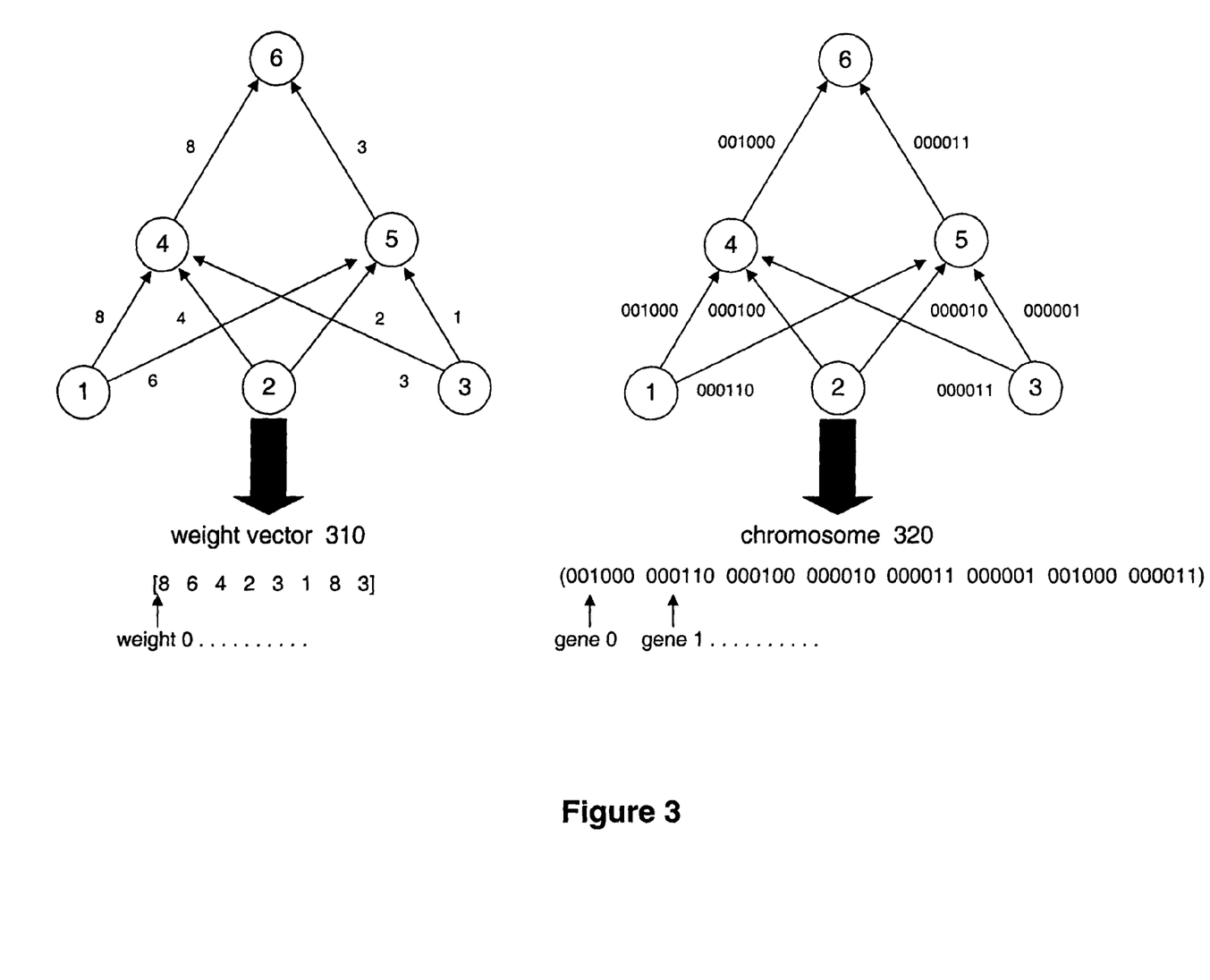
FIG. 3 is an exemplary diagram of a weight vector.

FIG. 3 shows an example of a weight vector 310 and chromosome 320. Weight vector 310 includes various weight values that may initially be selected at random. For ease of use during signal classification, it may be desirable to translate weight vector 310 into chromosome 320. Chromosome 320 represents the same values as weight vector 310, but the values of the weight vector have been converted to binary numbers. Conversion of weight vectors to binary numbers is optional as each chromosome value may also be represented as a decimal or other real number.

During the training of a neural network, each chromosome 320 within the population is evaluated by calculating its "fitness" relative to the given training set of weights. Such calculations for determining a weight's fitness can take many forms. Neural network training often determines fitness based on the mean square error (MSE) of the network averaged over the available training data. During each cycle or iteration of the training process for a "generation" of weights, the fitness of each weight may be calculated. Chromosomes are selected for further training in the next iteration of process based on their fitness for reproduction.

Selected chromosomes are modified using a series of genetic operations. Genetic operations, such as "selection," "reproduction," "crossover," and "mutation," modify each chromosome in a particular manner. Modification of chromosomes by genetic operations creates a new population of chromosomes and thus forms a new or "next generation" of chromosomes.

The population of chromosomes may continue to evolve or undergo genetic modification until the fitness of the chromosomes, which include candidate solutions for the weights, reaches a designated "stopping criterion." The population of weights is considered sufficiently accurate once the stopping criterion, which may vary due to parameters defined by a user, is met. The stopping criterion is discussed more fully below in connection with FIG. 4.

Figure 4:
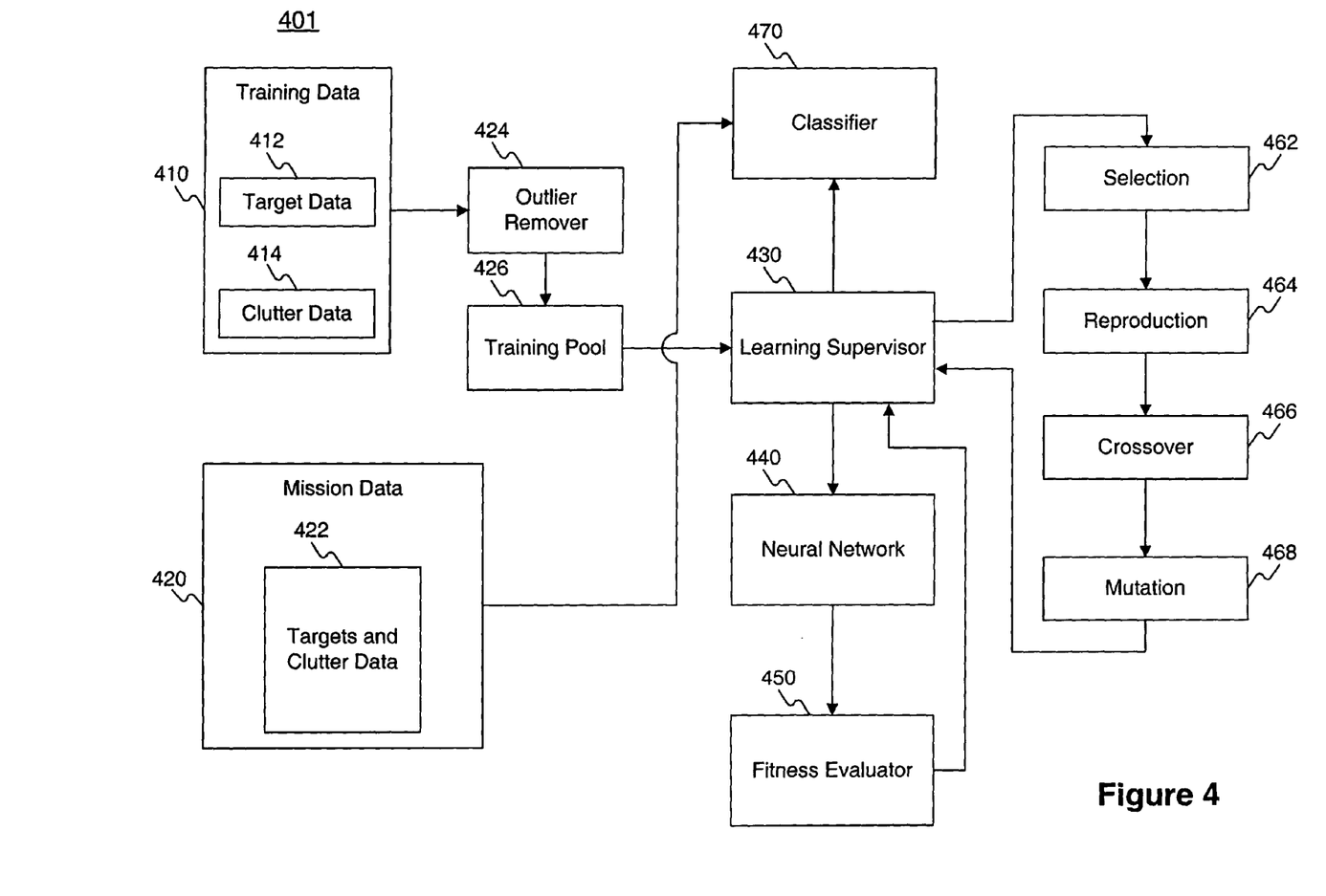
FIG. 4 is a diagram of a genetically adaptive neural network signal classification system.

FIG. 4 shows a diagram of a genetically adaptive neural network signal classification system 401. Construction of an in-situ training set 426 by signal classification system 401 begins by extracting features from a training database 410 that has archived target data 412 and clutter data 414 collected in-situ. One may consider target data 412 and clutter data 414 as "truth" data, meaning that the data has been previously collected from experiments and its classification is already known. For anti-submarine warfare applications, truth data comprises sonar echoes that have been previously identified as targets and clutter. Examples of features in the training database 410 may include various temporal and spectral characteristics of the waveforms.

Prior to training, training data 410 may be processed by outlier remover 424, which identifies "outlier" weight vectors. Outlier weight vectors are weight vectors with anomalous data values that are clearly out of the bounds of expected data. Thus, outlier remover 424 may discard weight vectors with values greater than a predetermined threshold value. After removing these weight vectors, the resulting data, training pool 426, includes only acceptable target data 412 and clutter data 414.

A learning supervisor 430 is the central coordination point of signal classification system 401, and guides the training process of a neural network 440 toward an optimal population of weight vectors. Functions of learning supervisor 430 include selecting subsets of feature vectors from training pool 426 and evaluating the fitness of corresponding weight vectors against a desired stopping criterion. The training process begins when the learning supervisor 430 creates an initial random population of weight vectors.

The fitness of candidate weight vectors are then evaluated within neural network 440 using truth data contained in training pool 426. Each weight vector is next assigned a fitness value by a fitness evaluator 450. As previously indicated, the fitness value of a weight vector is a measure of the weight vector's effectiveness for a given classification problem. Fitness evaluator 450 calculates MSE values for each candidate weight vector. An individual weight vector's fitness is given as the inverse of the larger of the two MSE values, which are the weight vector's MSE for target data and its MSE for clutter data. The relationship is given by equation (5), as $$f(W_i) = \max(\text{error}_{targets,i}, \text{error}_{clutter,i})^{-1} \quad (5)$$

where f represent the fitness of an individual weight vector, error represents the MSE for both targets and clutter, and $W_i$ is the weight vector i in the population. Once each candidate weight vector is assigned a fitness value, the population of weight vectors is assigned an overall fitness value.

Learning supervisor 430 next compares the overall fitness value of the population against a predetermined stopping criterion (not shown). A user may select a stopping criterion to indicate a level of accuracy desired of the weight vectors that will be used for subsequent signal classification once the network is trained.

The stopping criterion may be based on the average fitness of the population of weight vectors, for example. More specifically, the fitness of the individual weight vectors within the population may be summed and averaged with each generation, and the training process may terminate when the average fitness of the population reaches a given threshold. Selection of the stopping criterion depends on the complexity of the data used for training, and may be selected on a case-by-case basis and may vary based upon signal classification system 401's objectives.

For example, if the error value of the population is too large, as determined against the stopping criterion, the processing of weight vectors continues until the network achieves a desired accuracy. If the error value is equal to or less than the stopping criterion, the processing of weight vectors stops and a set of weight vectors may be used for signal classification. If learning supervisor 430 determines that the stopping criterion has not been reached, candidate weight vectors are next subjected to a series of genetic operations, which occur for each generation of the algorithm.

Signal classification system 401 includes genetic operators such as selection 462, reproduction 464, crossover 466, and mutation 468. Each operator used in signal classification system 401 may be implemented by using genetic algorithm subroutines written in a programming language, such as Matlab, C++, or any other suitable programming language. The following provides an overview of each genetic operation.

Selection operator 462 assigns a probability of selection for each weight vector in the population. Weight vectors are selected based on their individual fitness values as determined by fitness evaluator 450. Weight vectors not meeting an appropriate fitness are discarded and weight vectors meeting an appropriate fitness are maintained in the population.

Reproduction operator 464 creates a full population of weight vectors comprising duplicates of weight vectors selected by selection operator 462. Reproduction is done to fill out the population so that it preferably contains a number of weight vectors equal to the number of weight vectors in the population prior to selection. After sufficient iterations of the process, the selection and reproduction operators ensure that weight vectors with a high fitness are more likely to be reproduced in the evolving population.

Crossover operator 466 is a method of exchanging subparts of two weight vectors (swapping weights) to approximate the biological process of recombination between two individual chromosomes. Based on a given probability of crossover set by a user, crossover operator 466 randomly selects n pairs of weight vectors from the current population and identifies a single random crossover point around which information will be exchanged. For example, the strings 10101010 and 11111111 could be crossed-over after the third point in each chromosome to produce the two offspring 10111111 and 11101010.

Mutation operator 468 randomly changes values within the weight vectors to insure diversity in the population. Based on a given probability of mutation, which a user may define, mutation operator 468 selects n weight vectors within the population and randomly changes the values within those vectors. For example, the string 10101010 might be mutated in its first position at random to result in 00101010.

After selection operator 462 processes the population of weight vectors, reproduction operator 464, crossover operator 466, and mutation operator 468, learning supervisor 430 passes the population of weight vectors to neural network 440 and to fitness evaluator 450 begin another iteration of the algorithm, as explained above. Learning supervisor 430 then again evaluates a stopping criterion for the population. If the stopping criterion is not achieved, then learning supervisor 430 may continue another round of genetic operators.

When the stopping criterion is achieved, signal classifier 470 may use a subset of the fittest weight vectors from the final population for classification. For example, classifier 470 may select several of the fittest weight vectors from the final population for use in a neural network to classify mission data 420. Mission data 420 may include targets and clutter 422 mixed together collected during a mission. Accordingly, one or more series of neural networks can process data 420 to separate targets from clutter.

Figure 5:
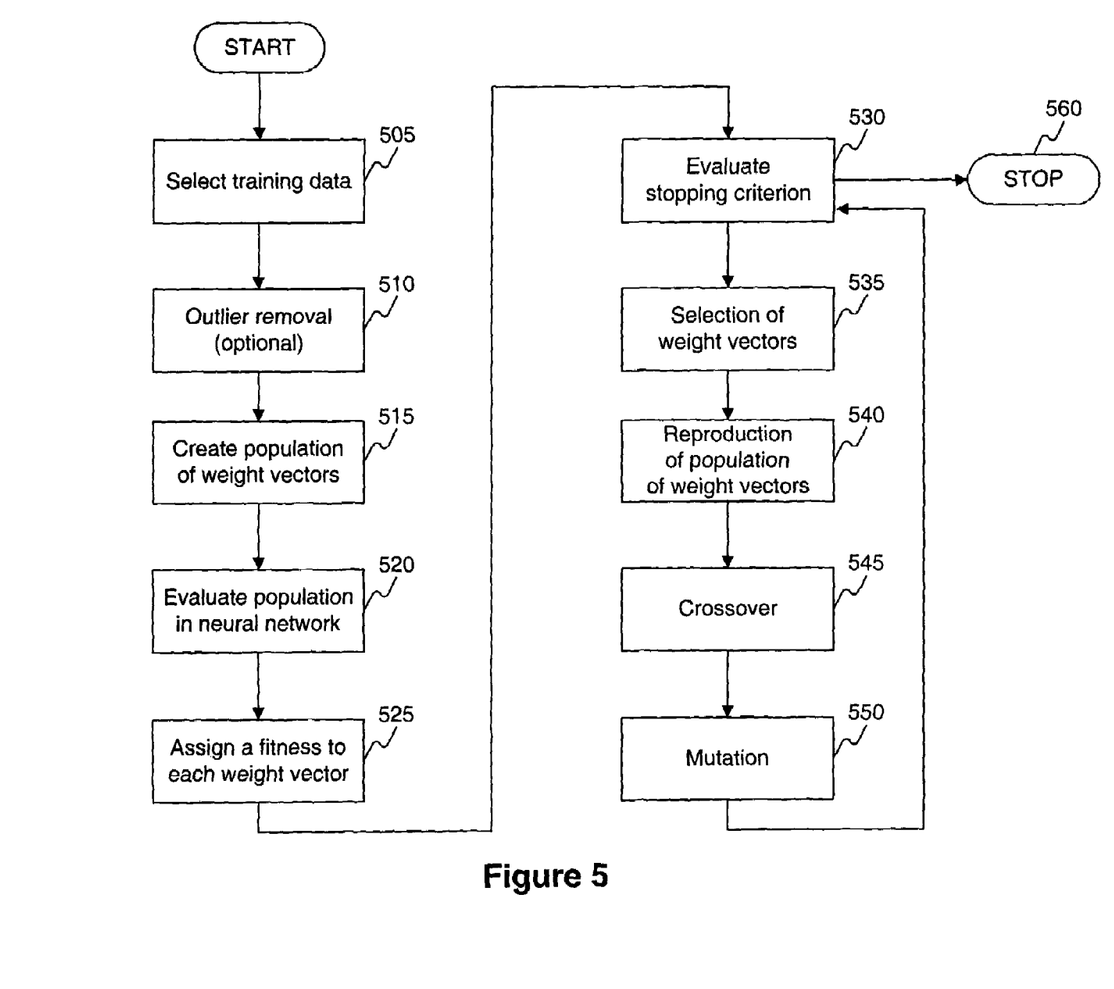
FIG. 5 is a flow diagram illustrating the operation of an exemplary genetically adaptive signal classification system consistent with this invention.

FIG. 5 is an exemplary flow diagram illustrating the operation of signal classification system 401. First, select training data (step 505). Such data typically includes target data and clutter data from the initial ping. Next, any anomalous data may be removed by an optional outlier removal function (step 510). Once the training process is initiated, an initial random population of weight vectors is created (step 515). The population of weight vectors is evaluated against a subset of the training data using a feed-forward adaptive neural network (step 520).

Next, during a fitness evaluation process, candidate weight vectors in the population are assigned a fitness based on the average MSE of an adaptive neural network comprising the weight vector and evaluated against the training data (step 525). The population of weight vectors may next be evaluated against a stopping criterion (step 530). If the stopping criterion has not been reached, then the process continues with the selection of weight vectors (step 535). The weight vectors selected having a probability above a given threshold. Weight vectors below the given threshold are discarded. Next, reproduction of the population occurs wherein selected weight vectors are duplicated to fill up the population (step 540).

Based on a user defined or randomly selected probability of crossover, which is a variable, n pairs of parent weight vectors are selected from the population and a random crossover point within those weight vectors is identified (step 545). Weights from the incoming links at a given crossover point of both parents are exchanged to create new weight vectors. Next, based on a given probability of mutation, n weight vectors within the population are selected and the value of a given bit is randomly changed to a random value between set boundaries (step 550). The process then returns to step 530 and may be repeated for additional iterations until the stopping criterion is met. Once the stopping criterion is met a population of the fitness weight vectors may be selected and used for signal classification (step 560).

Of course, specific architecture arrangements may vary and neural network architecture 100 should be understood as only an exemplary configuration of a neural network. Many other variations including larger or smaller numbers of input neurons, hidden layer neurons, and output layer neurons are possible and are consistent with neural network architecture.

Furthermore, although the examples in the discussion relate to sonar classification for underwater feature detection, systems and methods consistent with this invention may apply to various other areas of study, especially those areas involving signal classification. Such areas may include situations where environmental conditions significantly affect sensing phenomena and classification performance. For example, the use of land-based ground sensor networks where environmental changes such as atmospheric temperature profiles, wind, and boundary layer turbulence can affect the propagation of certain signals.

Systems and methods consistent with the present invention may thus train classifiers in-situ to identify targets, such as humans and vehicles, for example, with respect to pertinent features of the physical environment in an effort to enhance overall classification performance. Additional applications may include the classification of voice signals, image signal data, or any other area wherein signal classifications are classified, for example.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for genetically adaptive signal classification comprising:
   a learning supervisor for processing a population of weight vectors in a neural network using training data which includes a plurality of previously classified sonar waveforms;
   a fitness evaluator coupled to the learning supervisor for evaluating a fitness of the weight vectors against a stopping criterion based on the processed weight vectors; and
   a genetic operator, coupled to the fitness evaluator and the learning supervisor, for modifying the population of weight vectors and providing the modified weight vectors to the learning supervisor until the fitness evaluator indicates that the fitness of the weight vectors meets the stopping criterion, thereby yielding an acceptable set of weight vectors;
   wherein the neural network subsequently uses the acceptable set of weight vectors to classify sonar waveforms into a plurality of data classes.

2. The system of claim 1, wherein the learning supervisor has an input port to receive an initial set of random weight vectors.

3. The system of claim 1, wherein the genetic operator includes a selection operator for selecting weight vectors proportional to their fitness and for discarding weight vectors not meeting a specified level of fitness.

4. The system of claim 3, wherein the genetic operator further includes a reproduction operator for duplicating the selected weight vectors to produce a population with the same number of weight vectors prior to selection by the selection operator.

5. The system of claim 4, wherein the genetic operator further includes a crossover operator for exchanging weight vector information around a crossover point.

6. The system of claim 5, wherein the crossover operator randomly selects a variable number of weight vector pairs from a current population before exchanging weight vector information around the crossover point.

7. The system of claim 6, wherein the genetic operator includes a mutation operator for randomly changing weight vectors.

8. The system of claim 1, wherein classifying the sonar waveforms into a plurality of data classes comprises classifying a sonar waveform into a target data class to detect a target.

9. A method for genetically adaptive signal classification comprising:
processing a population of weight vectors in a neural network using training data which includes a plurality of previously classified sonar waveforms;
evaluating a fitness of the weight vectors against a stopping criterion based on the processed weight vectors; and
modifying the population of weight vectors and evaluating the fitness of the modified weight vectors until the fitness of the modified weight vectors meets the stopping criterion thereby yielding an acceptable set of weight vectors; and
subsequently using the acceptable set of weight vectors by the neural network to classify sonar waveforms into a plurality of classes.

10. The method of claim 9, wherein processing the population of weight vectors includes receiving an initial set of random weight vectors.

11. The method of claim 9, wherein genetically modifying the population of weight vectors includes selecting weight vectors proportional to their fitness and discarding weight vectors not meeting a specified level of fitness.

12. The method of claim 11, wherein genetically modifying the population of weight vectors further includes duplicating the selected weight vectors to produce a population with the same number of weight vectors as the initial population.

13. The method of claim 12, wherein genetically modifying the population of weight vectors includes exchanging weight vector information around a crossover point.

14. The method of claim 13, wherein exchanging weight vector information includes randomly selecting a variable number of weight vector pairs from the current population before exchanging weight vector information around the crossover point.

15. The method of claim 14, wherein genetically modifying the population of weight vectors includes randomly changing weight vectors.

16. The method of claim 9, wherein classifying the sonar waveforms into a plurality of data classes comprises classifying a sonar waveform into a target data class to detect a target.

17. A system for genetically adaptive signal classification of sonar waveforms comprising:
a learning supervisor for processing a population of weight vectors in a neural network using training data which includes a plurality of previously classified sonar waveforms;
a fitness evaluator coupled to the learning supervisor for evaluating a fitness of the weight vectors against a stopping criterion based on the processed weight vectors; and
a genetic operator, coupled to the fitness evaluator and the learning supervisor, for modifying the population of weight vectors and providing the modified weight vectors to the learning supervisor until the fitness evaluator indicates that the fitness of the weight vectors meets the stopping criterion, thereby yielding an acceptable set of weight vectors,
wherein the neural network subsequently uses the acceptable set of weight vectors to classify sonar waveforms into a plurality of classes.

18. The system of claim 17, wherein the learning supervisor has an input port to receive an initial set of random weight vectors.

19. The system of claim 17, wherein the genetic operator includes a selection operator for selecting weight vectors proportional to their fitness and for discarding weight vectors not meeting a specified level of fitness.

20. The system of claim 19, wherein the genetic operator further includes a reproduction operator for duplicating the selected weight vectors to produce a population with the same number of weight vectors prior to selection by the selection operator.

21. The system of claim 20, wherein the genetic operator further includes a crossover operator for exchanging weight vector information around a crossover point.

22. The system of claim 21, wherein the crossover operator randomly selects a variable number of weight vector pairs from a current population before exchanging weight vector information around the crossover point.

23. The system of claim 22, wherein the genetic operator includes a mutation operator for randomly changing weight vectors.

24. The system of claim 23, wherein the neural network uses a subset of the fittest weight vectors to classify the mission data.

25. The system of claim 17, wherein classifying the sonar waveforms into a plurality of data classes comprises classifying a sonar waveform into a target data class to detect a target.

26. A system for genetically adaptive signal classification comprising:
a learning supervisor for processing a population of weight vectors in a neural network using training data which includes one of sonar signals, voice signals, and image signals;
a fitness evaluator coupled to the learning supervisor for evaluating a fitness of the weight vectors against a stopping criterion based on the processed weight vectors; and
a genetic operator, coupled to the fitness evaluator and the learning supervisor, for modifying the population of weight vectors and providing the modified weight vectors to the learning supervisor until the fitness evaluator indicates that the fitness of the weight vectors meets the stopping criterion, thereby yielding an acceptable set of weight vectors;
wherein the neural network subsequently uses the acceptable set of weight vectors to classify the one of sonar signals, voice signals, and image signals into a plurality of data classes.

* * * * *